(12) United States Patent
Belling et al.

US012557156B2

(10) Patent No.: US 12,557,156 B2
(45) Date of Patent: Feb. 17, 2026

(54) INDIVIDUAL DELIVERY OF LOCATION-BASED MULTICAST SERVICES

(71) Applicant: NOKIA TECHNOLOGIES OY, Espoo (FI)

(72) Inventors: Horst Thomas Belling, Erding (DE); Philippe Godin, Versailles (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 374 days.

(21) Appl. No.: 17/879,434

(22) Filed: Aug. 2, 2022

(65) Prior Publication Data

US 2023/0039522 A1 Feb. 9, 2023

Related U.S. Application Data

(60) Provisional application No. 63/228,860, filed on Aug. 3, 2021.

(51) Int. Cl.
*H04W 76/15* (2018.01)
*H04L 69/14* (2022.01)

(52) U.S. Cl.
CPC ............. *H04W 76/15* (2018.02); *H04L 69/14* (2013.01)

(58) Field of Classification Search
CPC ....... H04W 76/15; H04W 76/40; H04W 4/06; H04W 72/03; H04L 69/14; H04L 12/14; H04L 12/185
See application file for complete search history.

(56) References Cited

U.S. PATENT DOCUMENTS

| | | | | |
|---|---|---|---|---|
| 2016/0088446 A1* | 3/2016 | Stephens | ................. | H04W 4/06 370/312 |
| 2016/0323846 A1* | 11/2016 | Park | ...................... | H04L 12/185 |
| 2018/0054765 A1* | 2/2018 | Kim | ...................... | H04W 36/32 |
| 2018/0206137 A1* | 7/2018 | Ryu | ........................ | H04W 4/06 |
| 2019/0289504 A1* | 9/2019 | Kim | .................. | H04W 36/0085 |

OTHER PUBLICATIONS

Extended European Search Report dated Jan. 3, 2023, corresponding to European Patent Application No. 22188209.5.

(Continued)

*Primary Examiner* — Mewale A Ambaye
(74) *Attorney, Agent, or Firm* — SQUIRE PATTON BOGGS (US) LLP

(57) ABSTRACT

Systems, methods, apparatuses, and computer program products for individual delivery of location-based multicast services are provided. One method may include receiving, by a session management node, information that a user equipment is participating in a multicast session, determining that the UE is served by a radio access node that does not support multicast sessions, and determining that the multicast session is only to be delivered to one or several service areas. In response to determining that the UE is served by a radio access node not supporting multicast and that the multicast session is only to be delivered to one or several service areas, the method further comprises subscribing to at least one notification from at least one access and mobility management node.

20 Claims, 10 Drawing Sheets

(56) References Cited

OTHER PUBLICATIONS

Qualcomm Incorporated et al: "KI#1 conclusions for broadcast", 3GPP Draft; S2-2009470, 3rd Generation Partnership Project (3GPP), Mobile Competence Centre ; 650, Route Des Lucioles ; F-06921 Sophia-Antipolis Cedex ; France, vol. SA WG2, No. e-meeting; Nov. 16, 2020-Nov. 20, 2020 Nov. 20, 2020 (Nov. 20, 2020), Nov. 20, 2020.

Sony: "Area of Interest granularity in 23.501",3GPP Draft; S2-177980 Was 7211 Area of Interest Granularity in 23.501, 3rd Generation Partnership Project (3GPP), Mobile Competence Centre ; 650, Route Des Lucioles ; F-06921 Sophia-Antipolis Cedex vol. SA WG2, No. Ljubljana, Slovenia; Oct. 23, 2017-Oct. 27, 2017, Oct. 26, 2017 (Oct. 26, 2017).

Communication under rule 71(3) EPC dated Feb. 2, 2024, corresponding to European Patent Application No. 22188209.5.

Communication under Rule 71(3) EPC dated Dec. 6, 2024, corresponding to European Patent Application No. 22188209.5.

Communication under Rule 71(3) EPC dated Jul. 12, 2024 in European Patent Application No. 22188209.5-1206.

3GPP TR 23.757, V17.0.0 (Mar. 2021), 3rd Generation Partnership Project; Technical Specification Group Services and System Aspects; Study on architectural enhancements for 5G multicast-broadcast services, (Release 17), 298 pages.

3GPP TS 23.288, V17.1.0 (Jun. 2021), 3rd Generation Partnership Project; Technical Specification Group Services and System Aspects; Architectural enhancements for 5G System (5GS) to support network data analytics services, (Release 17), 192 pages.

3GPP TS 23.247, V1.0.0 (Jun. 2021), 3rd Generation Partnership Project; Technical Specification Group Services and System Aspects; Architectural enhancements for 5G multicast-broadcast services, (Release 17), 81 pages.

3GPP TS 23.501, V17.1.0 (Jun. 2021), 3rd Generation Partnership Project; Technical Specification Group Services and System Aspects; System architecture for 5G System (5GS); Stage 2, (Release 17), 526 pages.

3GPP TS 23.502, V17.1.0 (Jun. 2021), 3rd Generation Partnership Project; Technical Specification Group Services and System Aspects; Procedures for the 5G System (5GS); Stage 2, (Release 17), 692 pages.

European Communication under Rule 71(3) EPC, corresponding to EP Application No. 22 188 209.5, dated May 8, 2025.

* cited by examiner

INDIVIDUAL DELIVERY OF LOCATION-BASED MULTICAST SERVICES

CROSS REFERENCE TO RELATED APPLICATION

This application claims the benefit of U.S. Provisional Application No. 63/228,860, filed Aug. 3, 2021. The entire content of the above-referenced application is hereby incorporated by reference.

TECHNICAL FIELD

Some example embodiments may generally relate to mobile or wireless telecommunication systems, such as Long Term Evolution (LTE), fifth generation (5G) radio access technology (RAT), new radio (NR) access technology, and/or other communications systems. For example, certain example embodiments may relate to systems and/or methods for individual delivery of location-based multicast services.

BACKGROUND

Examples of mobile or wireless telecommunication systems may include 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance. 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine type communication (mMTC). NR is expected to deliver extreme broadband, ultra-robust, low latency connectivity, and massive networking to support the Internet of Things (IoT). The next generation radio access network (NG-RAN) represents the RAN for 5G, which may provide radio access for NR, LTE, and LTE-A. It is noted that the nodes in 5G providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some embodiments, a method may include receiving, by a session management node, information that a user equipment is participating in a multicast session. The method may further include determining, by the session management node, that the user equipment is served by a radio access node that does not support multicast sessions. The method may further include determining, by the session management node, that the multicast session is only to be delivered to one or several service areas. The method may further include in response to determining that the user equipment is served by a radio access node not supporting multicast and that the multicast session is only to be delivered to one or several service areas, subscribing, by the session management node, to at least one notification from at least one access and mobility management node. The method may further include receiving, by the session management node, at least one notification from the at least one access and mobility management node associated with at least one location change of the user equipment. The method may further include determining, by the session management node, that the user equipment is located in a service area of the multicast session. The method may further include in response to the user equipment being served by the radio access node not supporting multicast, the user equipment being located in the service area of the multicast session, and data associated with the multicast session not yet transmitted within a protocol data unit session of the user equipment, configuring, by the session management node, a user plane function to transmit data associated with the multicast session within the protocol data unit session of the user equipment.

In accordance with certain embodiments, an apparatus may include means for receiving information that a user equipment is participating in a multicast session. The apparatus may further include means for determining that the user equipment is served by a radio access node that does not support multicast sessions. The apparatus may further include means for determining that the multicast session is only to be delivered to one or several service areas. The apparatus may further include means for subscribing to at least one notification from at least one access and mobility management node in response to determining that the user equipment is served by a radio access node not supporting multicast and that the multicast session is only to be delivered to one or several service areas. The apparatus may further include means for receiving at least one notification from the at least one access and mobility management node associated with at least one location change of the user equipment. The apparatus may further include means for determining that the user equipment is located in a service area of the multicast session. The apparatus may further include means for configuring a user plane function to transmit data associated with the multicast session within the protocol data unit session of the user equipment in response to the user equipment being served by the radio access node not supporting multicast, the user equipment being located in the service area of the multicast session, and data associated with the multicast session not yet transmitted within a protocol data unit session of the user equipment.

In accordance with various embodiments, an apparatus may include at least one processor and at least one memory including computer program code. The at least one memory and the computer program code may be configured to, with the at least one processor, cause the apparatus to at least receive information that a user equipment is participating in a multicast session. The at least one memory and the computer program code may be further configured to, with the at least one processor, cause the apparatus to at least determine that the user equipment is served by a radio access node that does not support multicast sessions. The at least one memory and the computer program code may be further configured to, with the at least one processor, cause the apparatus to at least determine that the multicast session is only to be delivered to one or several service areas. The at least one memory and the computer program code may be further configured to, with the at least one processor, cause the apparatus to at least in response to determining that the user equipment is served by a radio access node not supporting multicast and that the multicast session is only to be delivered to one or several service areas, subscribe to at least one notification from at least one access and mobility management node. The at least one memory and the computer program code may be further configured to, with the at least one processor, cause the apparatus to at least receive at least one notification from the at least one access and mobility management node associated with at least one location change of the user equipment. The at least one memory and the computer program code may be further configured to, with the at least one processor, cause the apparatus to at least determine that the user equipment is located in a service area of the multicast session. The at least one memory and the computer program code may be further configured to, with the at least one processor, cause the apparatus to at least in response to the user equipment being served by the radio access node not supporting multicast, the user equipment being located in the service area of the multicast session, and data associated with the multicast session not yet transmitted within a protocol data unit session of the user equipment, configure a user plane function to transmit data associated with the multicast session within the protocol data unit session of the user equipment.

In accordance with some embodiments, a non-transitory computer readable medium may be encoded with instructions that may, when executed in hardware, perform a method. The method may include receiving information that a user equipment is participating in a multicast session. The method may further include determining that the user equipment is served by a radio access node that does not support multicast sessions. The method may further include determining that the multicast session is only to be delivered to one or several service areas. The method may further include in response to determining that the user equipment is served by a radio access node not supporting multicast and that the multicast session is only to be delivered to one or several service areas, subscribing to at least one notification from at least one access and mobility management node. The method may further include receiving at least one notification from the at least one access and mobility management node associated with at least one location change of the user equipment. The method may further include determining that the user equipment is located in a service area of the multicast session. The method may further include in response to the user equipment being served by the radio access node not supporting multicast, the user equipment being located in the service area of the multicast session, and data associated with the multicast session not yet transmitted within a protocol data unit session of the user equipment, configuring a user plane function to transmit data associated with the multicast session within the protocol data unit session of the user equipment.

In accordance with certain embodiments, a computer program product may perform a method. The method may include receiving information that a user equipment is participating in a multicast session. The method may further include determining that the user equipment is served by a radio access node that does not support multicast sessions. The method may further include determining that the multicast session is only to be delivered to one or several service areas. The method may further include in response to determining that the user equipment is served by a radio access node not supporting multicast and that the multicast session is only to be delivered to one or several service areas, subscribing to at least one notification from at least one access and mobility management node. The method may further include receiving at least one notification from the at least one access and mobility management node associated with at least one location change of the user equipment. The method may further include determining that the user equipment is located in a service area of the multicast session. The method may further include in response to the user equipment being served by the radio access node not supporting multicast, the user equipment being located in the service area of the multicast session, and data associated with the multicast session not yet transmitted within a protocol data unit session of the user equipment, configuring a user plane function to transmit data associated with the multicast session within the protocol data unit session of the user equipment.

In accordance with various embodiments, an apparatus may include circuitry configured to receive information that a user equipment is participating in a multicast session. The circuitry may further be configured to determine that the user equipment is served by a radio access node that does not support multicast sessions. The circuitry may further be configured to determine that the multicast session is only to be delivered to one or several service areas. The circuitry may further be configured to in response to determining that the user equipment is served by a radio access node not supporting multicast and that the multicast session is only to be delivered to one or several service areas, subscribe to at least one notification from at least one access and mobility management node. The circuitry may further be configured to receive at least one notification from the at least one access and mobility management node associated with at least one location change of the user equipment. The circuitry may further be configured to determine that the user equipment is located in a service area of the multicast session. The circuitry may further be configured to in response to the user equipment being served by the radio access node not supporting multicast, the user equipment being located in the service area of the multicast session, and data associated with the multicast session not yet transmitted within a protocol data unit session of the user equipment, configure a user plane function to transmit data associated with the multicast session within the protocol data unit session of the user equipment.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for individual delivery of location-based multicast services is not intended to limit the scope of certain embodiments, but is instead representative of selected example embodiments.

Figure 1:
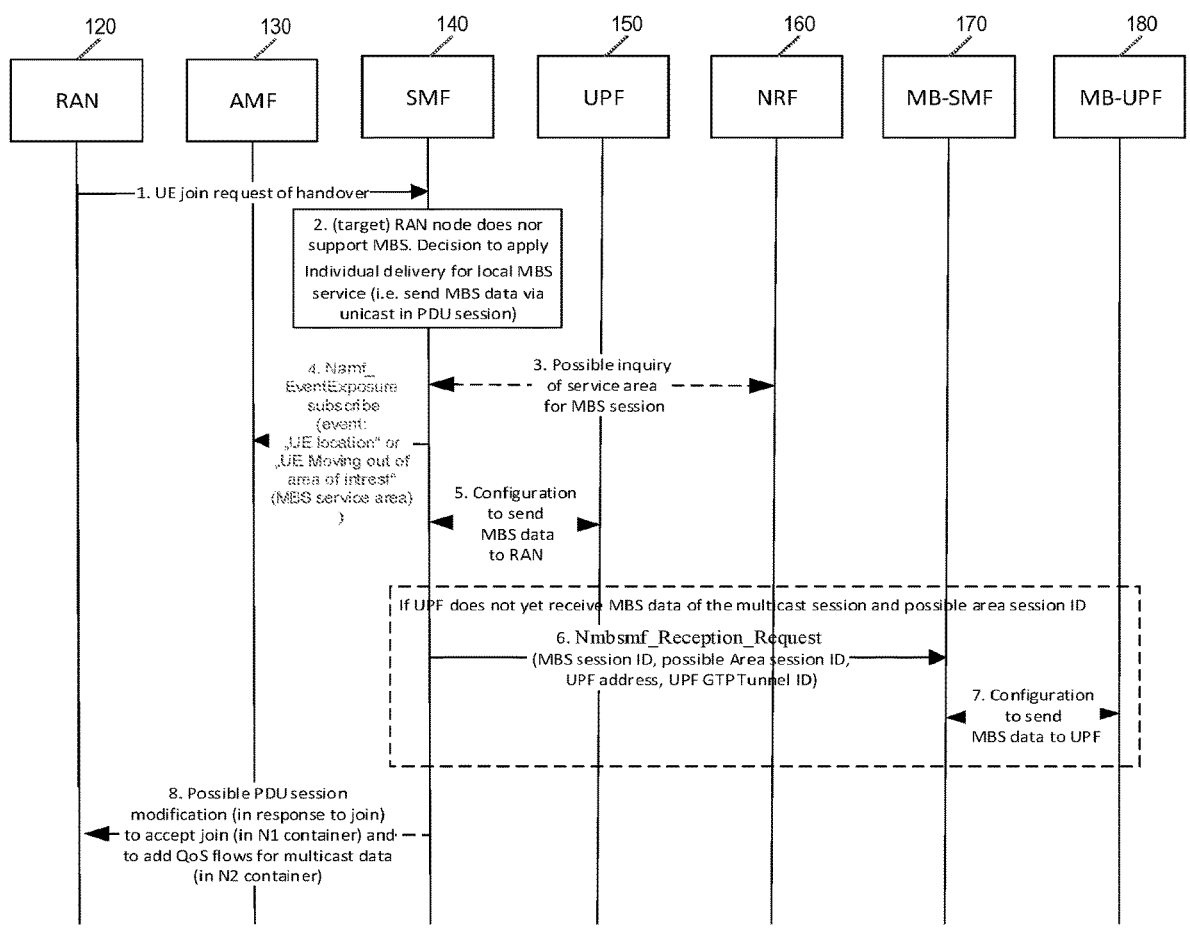
FIG. 1 illustrates a signaling diagram of an example according to various embodiments.

FIG. 1 illustrates an example of a signaling diagram depicting how to fallback to individual delivery for local or location-dependent multicast sessions, according to an example embodiment. As depicted in the example of FIG. 1, RAN 120, AMF 130, SMF 140, UPF 150, NRF 160, MB-SMF 170, and MB-UPF 180 may be similar to NE 910, as illustrated in FIG. 9, according to certain embodiments.

Figure 9:
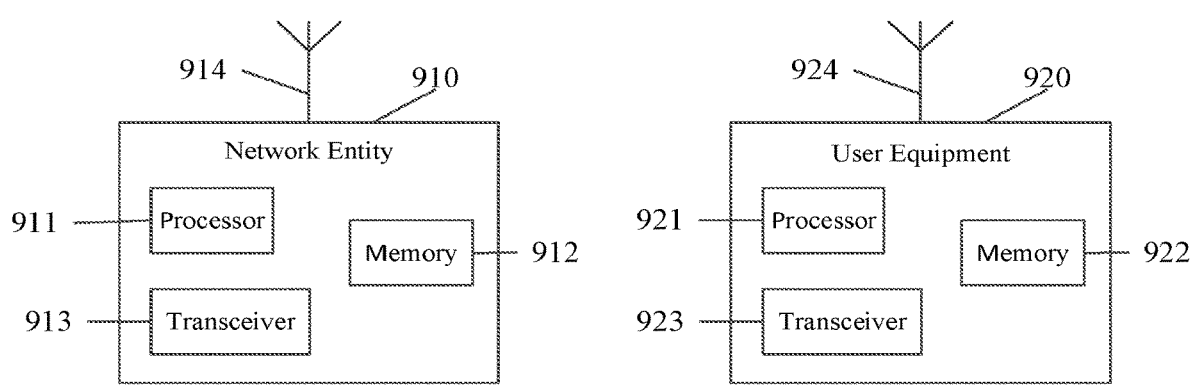
FIG. 9 illustrates an example of various network devices according to some embodiments.

As illustrated in FIG. 1, at 1, when a UE (not shown, but which may be similar to UE 920 as illustrated in FIG. 9) joins a multicast session and/or during handover of the UE within a multicast session, SMF 140 serving the UE may discover, such as via signalling, from the RAN (via AMF 130) whether RAN node 120 serving the UE supports MBS.

In the example of FIG. 1, at 2, after a handover to a target RAN node, if RAN node 120 serving the UE does not support MBS, SMF 140 may determine to apply individual delivery towards the UE. For example, SMF 140 may determine to transmit data related to the multicast session via unicast delivery within a PDU session of the UE.

As illustrated in FIG. 1, at 3, if SMF 140 does not yet have information about a service area of the multicast session, SMF 140 may request and receive service area information from NRF 160.

As illustrated in FIG. 1, at 4, if the multicast session relates to a local MBS service (e.g., the same multicast data is delivered to a limited service area) and/or a location-dependent MBS service (e.g., different multicast data is delivered to different service area of the multicast session), and SMF 140 configures 5GC individual MBS traffic delivery, SMF 140 may subscribe to AMF 130 using, for example, a Namf_EventExposure service. In some embodiments, AMF 130 may subscribe either to notifications about UE location changes and/or to notifications about the UE moving in and/or out of a subscribed "area of interest" event. For "area of interest" events, SMF 140 may provide the service area of the multicast session as "area of interest."

In the example of FIG. 1, at 5, SMF 140 may configure UPF 150 to transmit data related to the multicast session and/or for location-dependent multicast sessions related to the service area via unicast delivery within a PDU session of the UE.

As illustrated in FIG. 1, at 6, if UPF 150 has not received data related to the multicast session and/or for location-dependent multicast sessions related to the service area, SMF 140 may request, from MB-SMF 170, that data related to the multicast session and/or location-dependent multicast sessions related to the service area be delivered to UPF 150.

In the example of FIG. 1, at 7, upon the completion of procedure 6, MB-SMF 170 may configure MB-UPF 180 to send MBS data to UPF 150. At 8, if a UE join request was received at 1, SMF 140 may modify related PDU sessions to accept the join request (e.g., within an N1 container to be delivered to the UE) and/or to add QoS flows for multicast data (in an N2 container to be handled by the RAN node).

Figure 2:
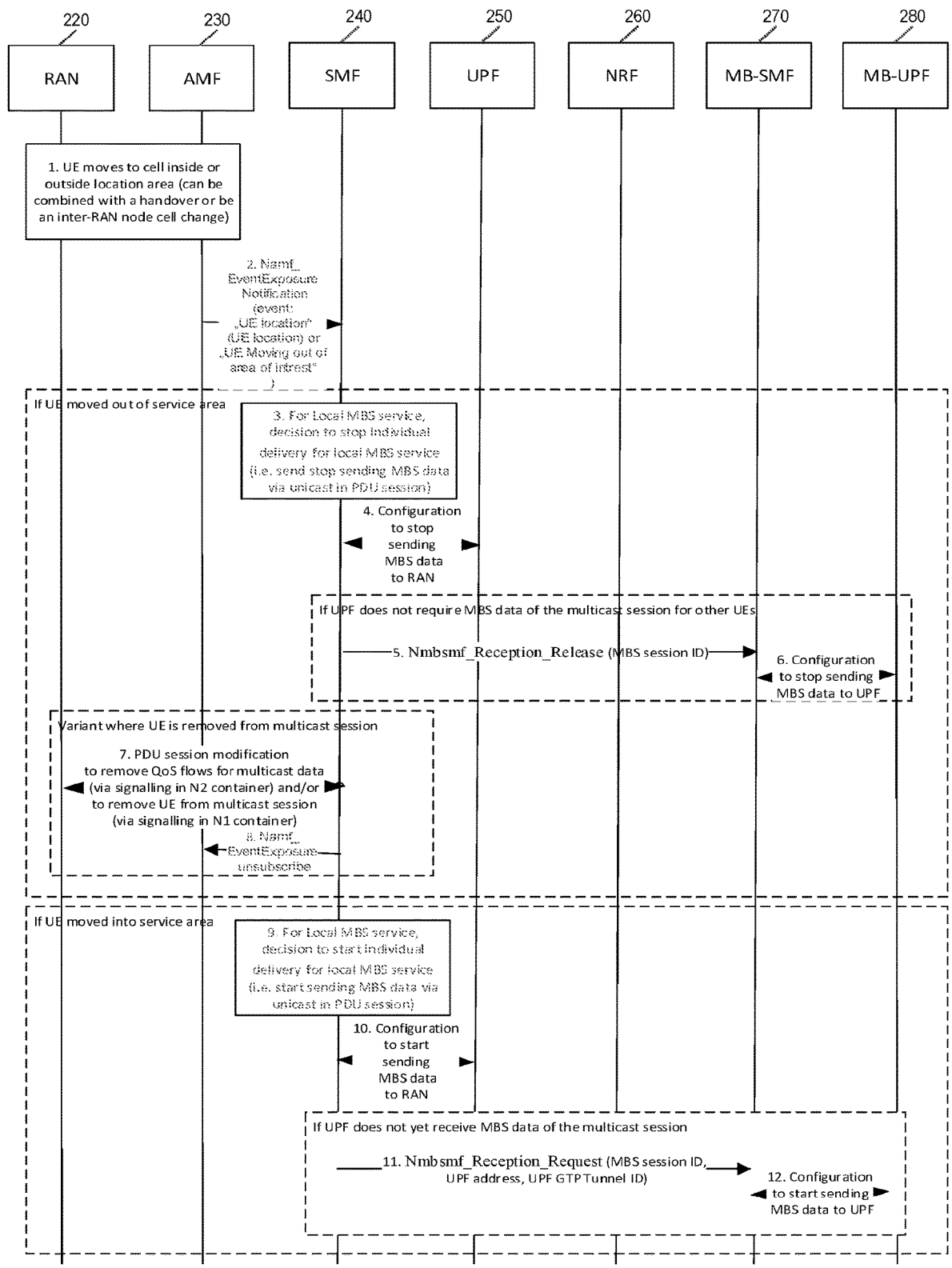
FIG. 2 illustrates a signaling diagram of another example according to certain embodiments.

FIG. 2 illustrates an example of a signaling diagram depicting a UE moving out of service area during individual delivery for local multicast session (i.e., the same multicast data are delivered to a limited service area), according to an example embodiment. In the example of FIG. 2, RAN 220, AMF 230, SMF 240, UPF 250, NRF 260, MB-SMF 270, and MB-UPF 280 may be similar to NE 910, as illustrated in FIG. 9, according to certain embodiments.

As illustrated in the example of FIG. 2, at 1, a UE (not shown, but which may be similar to UE 920 as illustrated in FIG. 9) may move to another cell, either served by the same RAN node (inter-RAN node mobility) or by a different RAN node (handover).

In the example of FIG. 2, at 2, if SMF 240 has subscribed to location changes, SMF 240 may receive notifications about each cell change. For example, if the notifications relate to the UE moving in or out of a subscribed "area of interest" event, SMF 240 may receive notifications when the UE enters or leaves the area of interest. Similarly, if SMF 240 receives a UE location change notification, SMF 240 may check whether the new UE location is inside or outside of the service area of the MBS session.

In some embodiments, the UE may leave the service area of the multicast session. In this situation, at 3, SMF 240 may cease individual delivery towards the UE (i.e., SMF 240 may determine to stop sending data related to the multicast session via unicast delivery within a PDU session of the UE). As illustrated in the example of FIG. 2, at 4, SMF 240 may configure UPF 250 to stop sending data related to the multicast session via unicast delivery within a PDU session of the UE.

In the example of FIG. 2, at 5, if UPF 250 does not require data related to the multicast session for other UEs, SMF 240 may request, from MB-SMF 270, that data related to the multicast session are no longer delivered to UPF 250. At 6, in response to the request at 5, MB-SMF 270 may configure MB-UPF 280 accordingly. Additionally or alternatively, SMF 240 may determine to remove the UE from the multicast session. In this case, at 7, SMF 240 may update the PDU session to inform the UE that SMF 240 was removed from the multicast session (via a N1 container sent to RAN node 220 and then forwarded to the UE), and then remove information related to the multicast session from the PDU session (e.g., QoS flows to deliver multicast data, via N2 container to be processed by RAN node 220). At 8, SMF 240 may unsubscribe, at AMF 230, from notifications about the UE location or the UE moving in or out of a subscribed "area of interest" event using a Namf_EventExposure service.

In certain embodiments, the UE may enter the service area of the multicast session. Specifically, as illustrated in the example of FIG. 2 at 9, SMF 240 may determine when to apply individual delivery towards the UE (i.e., SMF 240 may determine to transmit data related to the multicast session via unicast delivery within a PDU session of the UE). At 10, SMF 240 may configure UPF 250 to transmit data to the multicast session via unicast delivery within a PDU session of the UE. At 11, if UPF 250 has not received data related to the multicast session, SMF 240 may request, from MB-SMF 270, that data related to the multicast session be delivered to UPF 250. At 12, in response to the request at 11, MB-SMF 270 may configure MB-UPF 280 accordingly.

Figure 3:
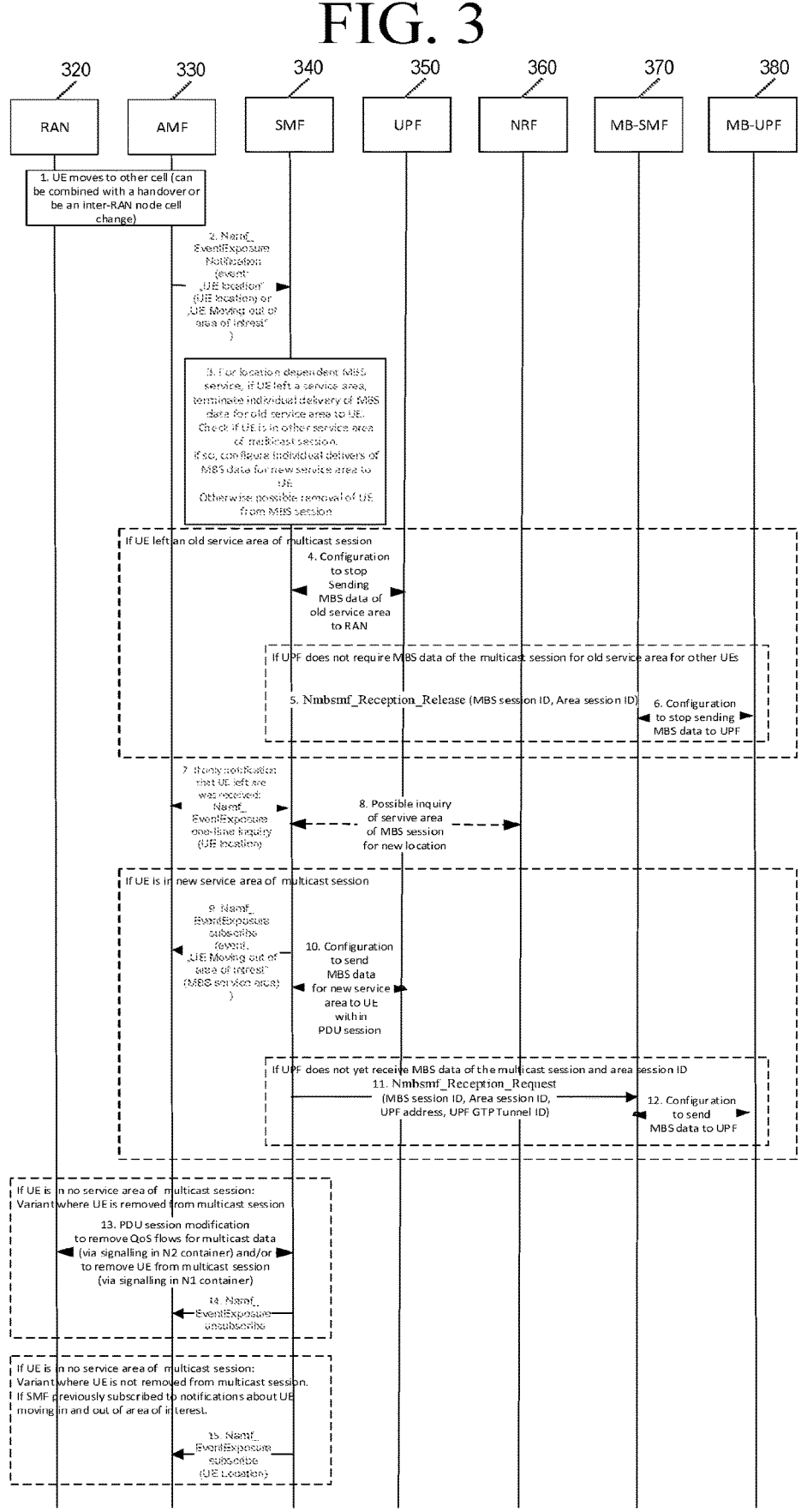
FIG. 3 illustrates a signaling diagram of another example according to some embodiments.

FIG. 3 illustrates an example of a signaling diagram depicting UE moving out of service area during individual delivery for location-dependent multicast session (i.e., different multicast data are delivered to different service areas of the multicast session), according to an example embodiment. In the example of FIG. 3, RAN 320, AMF 330, SMF 340, UPF 350, NRF 360, MB-SMF 370, and MB-UPF 380 may be similar to NE 910, as illustrated in FIG. 9, according to certain embodiments.

As illustrated in the example of FIG. 3, at 1, a UE (not shown, but which may be similar to UE 920 as illustrated in FIG. 9) may move to another cell, which may be served either by the same RAN node (inter-RAN node mobility) or by a different RAN node (handover).

In the example of FIG. 3, at 2, if SMF 340 has subscribed to location changes, SMF 340 may receive a notification about every cell change. For example, if the notifications relate to the UE moving in or out of a subscribed "area of interest" event, SMF 340 may receive notifications when the UE enters or leaves the area of interest. If SMF 340 receives a UE location change notification, SMF 340 may check whether the new UE location is inside or outside the old service area of the MBS session where the UE was previously located (if any).

As illustrated in the example of FIG. 3, at 3, if the UE leaves a service area of the multicast session, SMF 340 may determine to terminate individual delivery of MBS data for that old service area to the UE. As will be discussed in more detail below, SMF 340 may also check if the UE is in another service area of the multicast session. If so, SMF 340 may configure individual delivery of MBS data for the new service area to the UE. Otherwise, in some embodiments, SMF 340 may remove the UE from the MBS session.

In some embodiments, the UE may leave a previous service area of the multicast session. In this situation, as illustrated at 4, SMF 340 may configure UPF 350 to stop sending data related to the multicast session and service area via unicast delivery within a PDU session of the UE. At 5, if UPF 350 does not require data related to the multicast session and service area for other UEs, SMF 340 may request from MB-SMF 370 that data related to the multicast session and service area no longer be delivered to UPF 350. At 6, in response to the request at 5, MB-SMF 370 may configure MB-UPF 380 accordingly.

In the example of FIG. 3, at 7, if SMF 340 has subscribed to AMF 330 to notifications related to the area of interest event, and was only informed that the UE left the area of interest at 2, SMF 340 may request the UE location from AMF 330 using a Namf_EventExposure service. At 8, if SMF 340 has no information about a service area for the multicast service for the new UE location, SMF 340 may request a service area for the multicast service for the new UE location from NRF 360.

In certain embodiments, the UE may enter a new service area of the multicast session. In these embodiments, as illustrated at 9, if SMF 340 subscribed to AMF 330 to notifications related to the area of interest event, SMF 340 may update the subscription by supplying the new service area as an area of interest. At 10, SMF 340 may configure UPF 350 to send data related to the multicast session and service area via unicast delivery within a PDU session of the UE. At 11, if UPF 350 has not received data related to the multicast session and service area, SMF 340 may request from MB-SMF 370 that data related to the multicast session and service area be delivered to UPF 350. At 12, in response to the request at 11, MB-SMF may configure MB-UPF 380 accordingly.

In some embodiments, if the UE is not in any service area of the multicast session, SMF 340 may decide to remove the UE from the multicast session. For example, as illustrated at 13, SMF 340 may update the PDU session to inform the UE that SMF 340 was removed from the multicast session (e.g., via a N1 container sent to the RAN node and then forwarded to the UE), and the remove information related to the multicast session from the PDU session (e.g., QoS flows to deliver multicast data, via N2 container to be processed by RAN node 320). At 14, SMF 340 may unsubscribe at AMF 330 from the notifications about the UE location or the UE moving in or out of a subscribed "area of interest" event using a Namf_EventExposure service.

In the example of FIG. 3, at 15, if the UE is not in a service area of the multicast session, and SMF 340 previously subscribed at AMF 330 to notification related to the area of interest event, SMF 340 may update the subscription to instead subscribe to notifications about the UE location.

Figure 4:
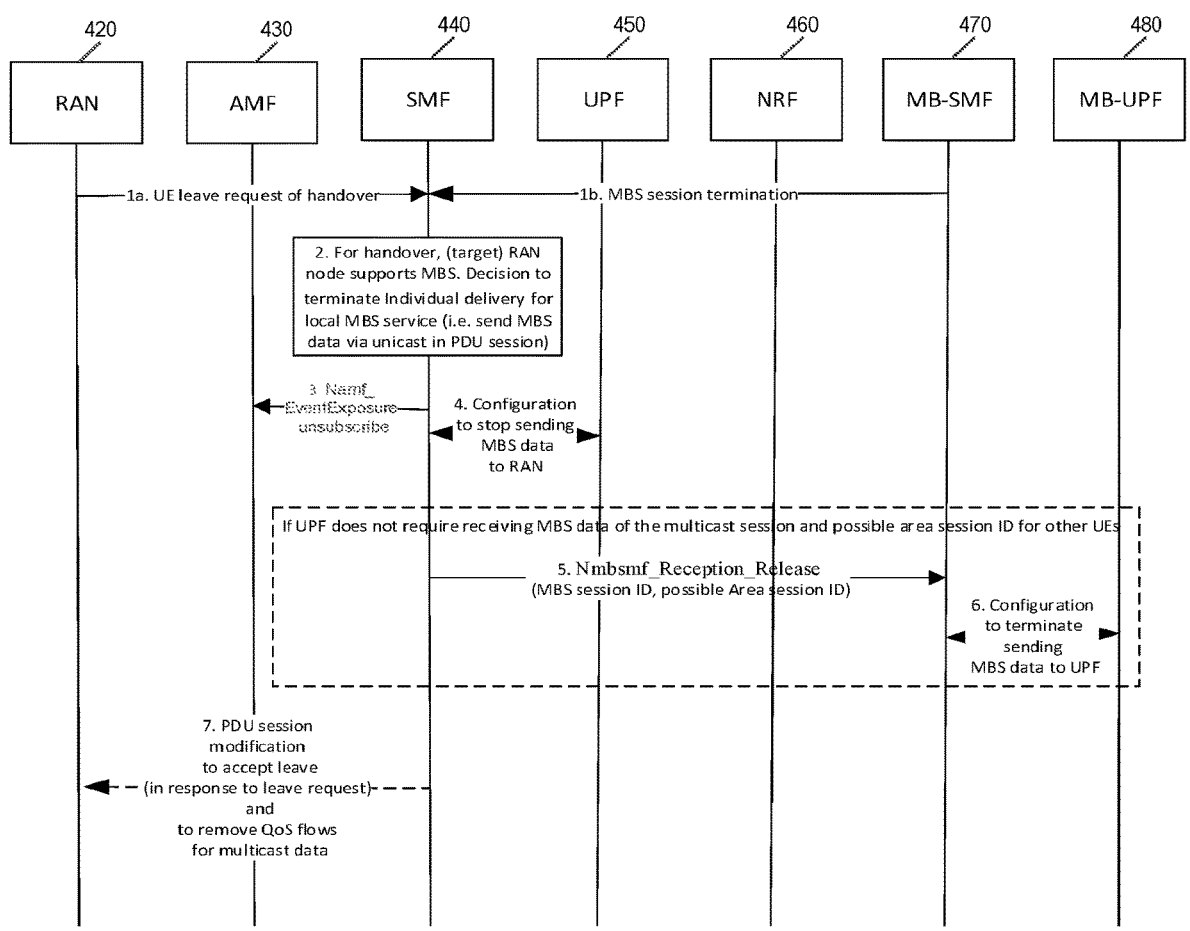
FIG. 4 illustrates a signaling diagram of another example according to several embodiments.

FIG. 4 illustrates an example of a signaling diagram depicting termination of individual delivery for local or location-dependent multicast session, according to an example embodiment. In the example of FIG. 4, RAN 420, AMF 430, SMF 440, UPF 450, NRF 460, MB-SMF 470, and MB-UPF 480 may be similar to NE 910, as illustrated in FIG. 9, according to certain embodiments.

As illustrated in the example of FIG. 4, at 1, when a UE (not shown, but which may be similar to UE 920 as illustrated in FIG. 9) requests to leave a multicast session, SMF 440 may be informed of the UE's request. During handover of a UE within a multicast session, SMF 440 serving the UE may discover via signalling from the RAN (via AMF 430) whether RAN node 420 serving the UE supports MBS. If the multicast session is terminated, SMF 440 may be informed by MB-SMF 470.

In the example of FIG. 4, at 2, multicast data for the multicast session may be delivered to the UE via individual delivery. If the UE requests to leave the multicast session, if the target RAN node serving the UE after a handover supports MBS, and/or if the MBS session is terminated, SMF 440 may terminate individual delivery.

As illustrated in the example of FIG. 4, at 3, SMF 440 may unsubscribe at AMF 430 from the notifications about the UE location or the UE moving into or out of a subscribed "area of interest" event using a Namf_EventExposure service.

In the example of FIG. 4, at 4, SMF 440 may configure UPF 450 to stop sending data related to the multicast session and possible service area via unicast delivery within a PDU session of the UE.

In the example of FIG. 4, at 5, if UPF 450 does not require data related to the multicast session and possible service area for other UEs, SMF 440 may request from MB-SMF 470 that data related to the multicast session and possible service area are no longer delivered to UPF 450. At 6, in response to the request at 5, MB-SMF 470 may configure MB-UPF 480 accordingly.

As illustrated in the example of FIG. 4, at 7, SMF 440 may modify the related PDU session to remove QoS flows for multicast data (e.g., in an N2 container to be handled by RAN node 420). If a UE leave request was received at 1, SMF 440 may accept the leave request (e.g., within a N1 container to be delivered to the UE).

Figure 5:
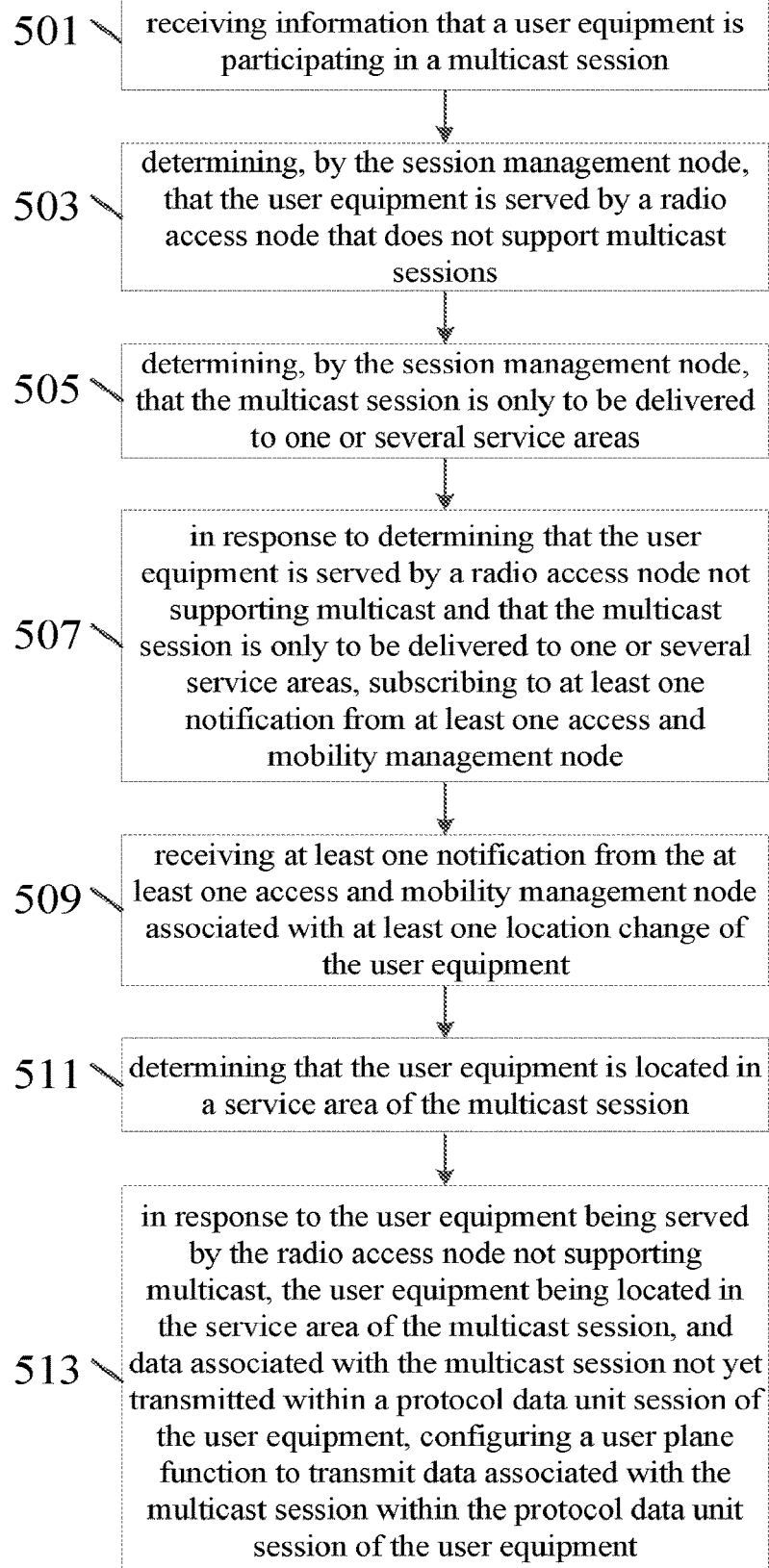
FIG. 5 illustrates a flow diagram of an example of a method according to various embodiments.

FIG. 5 illustrates an example of a flow diagram of a method that may be performed by a SMF (session management node), such as NE 910 illustrated in FIG. 9, according to various embodiments.

At 501, the SMF may receive information that a UE (which may be similar to UE 920, as illustrated in FIG. 9) is participating in a multicast session, such as via signalling from the RAN (via an AMF, which may be similar to NE 910 in FIG. 9). In some embodiments, the information that the UE is participating in the multicast session is received in a join request of the UE for the multicast session.

At 503, the SMF may determine that the UE is served by a radio access node that does not support multicast sessions. In various embodiments, the SMF may further configure a PDU session of the UE with information about the multicast session, and/or receive a message updating session management context of the PDU session without information about the multicast session. Furthermore, the determining that the user equipment is served by a radio access node not supporting multicast sessions may occur during a modification or a setup of the protocol data unit session of the user equipment with information about the multicast session after receiving a join request of the user equipment for the multicast session, or when the user equipment is handed over to a radio access node not supporting multicast.

At 505, the SMF may determine that the multicast session is only to be delivered to one or several service areas. In various embodiments, the SMF may further acquire, from a network repository function or multicast broadcast session management function, information about the multicast session comprising at least one service area associated with the multicast session.

At 507, in response to determining that the user equipment is served by a radio access node not supporting multicast and that the multicast session is only to be delivered to one or several service areas, the SMF may subscribe to at least one notification from at least one access and mobility management node. In some embodiments, the at least one notification received from the at least one access and mobility management node associated with at least one location change may comprise a notification of the Namf_EventExposure service associated with at least one of "user equipment location" or "user equipment moving out of area of interest" events. Furthermore, the subscription to the "user equipment moving out of area of interest" event may comprise the service area of the multicast service where the user equipment is located as area of interest. In addition, the transmitted data associated with the multicast session may be associated with the service area of the multicast session where the user equipment is located.

At 509, the SMF may receive at least one notification from the at least one access and mobility management node associated with at least one location change of the UE.

At 511, the SMF may determine that the user equipment is located in a service area of the multicast session. In some embodiments, the SMF may determine that the UE left a service area of the multicast session, and, upon determining that the user equipment left a service area of the multicast session, and that data associated with the multicast session and service area are transmitted within a protocol data unit session of the user equipment, the SMF may configure the user plane function to terminate transmitting data associated with the multicast session and service area within the protocol data unit session of the user equipment.

In various embodiments, the determining that the user equipment left a service area of the multicast session further may comprises at least one of obtaining a notification from the at least one access and mobility management node that the user equipment left the area of interest and obtaining location information about the user equipment according to at least one of within a protocol data unit session management related message for the user equipment, by inquiring the at least one access and mobility management node for the location of the user equipment; or within the at least one notification from at least one access and mobility management node associated with at least one location change of the user equipment.

In certain embodiments, the SMF may determine that the user equipment is located in a second service area of the multicast session, and configure when the user equipment is served by a radio access node not supporting multicast, and the user equipment is located in the second service area of the multicast session, the user plane function to transmit data associated with the multicast session and the second service area within the protocol data unit session of the user equipment.

In some embodiments, the SMF may subscribe when the user equipment is served by a radio access node not supporting multicast and the user equipment is located in the second service area of the multicast session, to at least one notification from at least one access and mobility management node associated with the "user equipment moving out of area of interest" event of the user equipment and comprising the second service area as area of interest.

In certain embodiments, the determining by the SMF that the user equipment is located in the service area or the second service area of the multicast session may comprise obtaining location information about the user equipment by at least one of a PDU session management related message for the user equipment, inquiring the at least one access and mobility management node for the location of the user equipment, or at least one notification from at least one access and mobility management node associated with at least one location change of the user equipment.

At 513, in response to the UE being served by the radio access node not supporting multicast, the UE being located in the service area of the multicast session, and data associated with the multicast session not yet transmitted within a protocol data unit session of the UE, the SMF may configure may configure a user plane function to transmit data associated with the multicast session within the protocol data unit session of the user equipment.

In various embodiments, the SMF may request when data related to the multicast session and the service area or the second service are not yet received by the user plane function, from a multicast/broadcast session management function, that data related to the multicast session and the service area or the second service area be delivered to the user plane function.

In some embodiments, the SMF may determine that the user equipment left the multicast session, or the multicast session is terminated, or that the user equipment is served by a radio access node supporting multicast; terminate the subscription to the at least one notification from the at least one access and mobility management node associated with at least one location change of the user equipment; and configure when data associated with the multicast session and service area are transmitted within a protocol data unit session of the user equipment, the user plane function to terminate transmitting data associated with the multicast session and service area within the protocol data unit session of the user equipment.

In certain embodiments, the SMF may request when configuring the user plane function to terminate transmitting data associated with the multicast session and service area within the protocol data unit session of the user equipment, and data related to the multicast session and service area are not transmitted by the user plane function to any other user equipment, from the multicast/broadcast session management function, that data related to the multicast session and the service area no longer be delivered to the user plane function.

Figure 6:
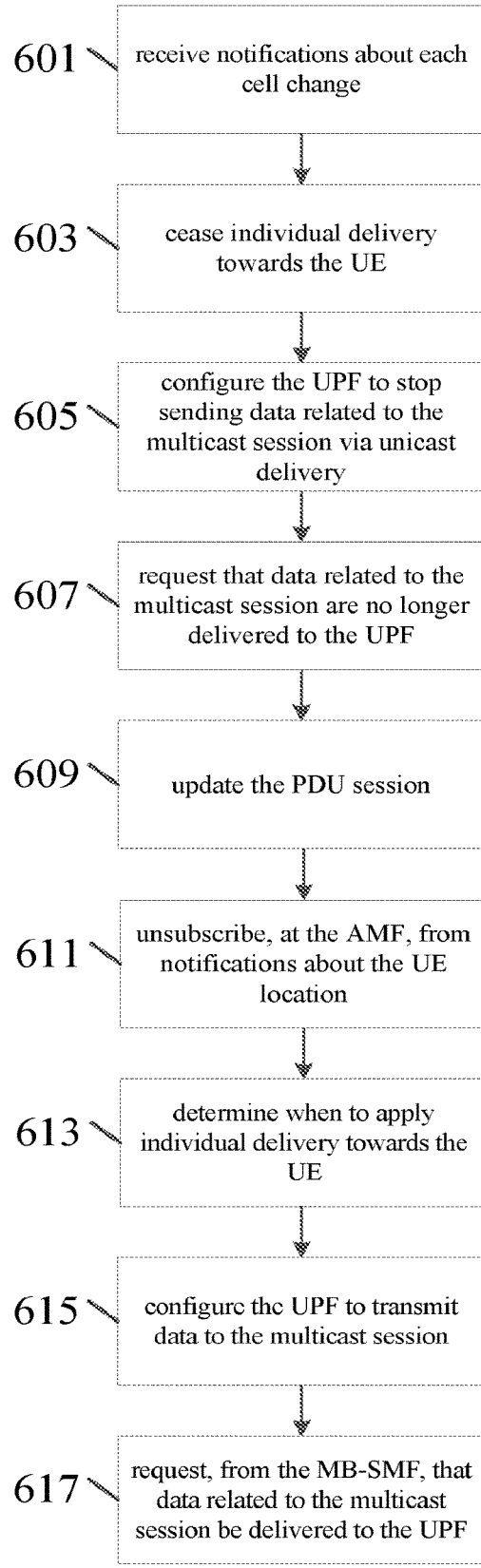
FIG. 6 illustrates a flow diagram of another example of a method according to certain embodiments.

FIG. 6 illustrates an example of a flow diagram of a method that may be performed by a SMF, such as SMF 910 illustrated in FIG. 9, according to various embodiments.

At 601, if the SMF has subscribed to location changes, the SMF may receive notifications about each cell change. For example, if the notifications relate to the UE moving in or out of a subscribed "area of interest" event, the SMF may receive notifications when the UE enters or leaves the area of interest Similarly, if the SMF receives a UE location change notification, the SMF may check whether the new UE location is inside or outside of the service area of the MBS session.

In some embodiments, the UE may leave the service area of the multicast session. In this situation, at 603, the SMF may cease individual delivery towards the UE (i.e., the SMF may determine to stop sending data related to the multicast session via unicast delivery within a PDU session of the UE). At 605, the SMF may configure the UPF to stop sending data related to the multicast session via unicast delivery within a PDU session of the UE.

At 607, if the UPF does not require data related to the multicast session for other UEs, the SMF may request, from an MB-SMF, that data related to the multicast session are no longer delivered to the UPF. Additionally or alternatively, the SMF may determine to remove the UE from the multicast session. In this case, at 609, the SMF may update the PDU session to inform the UE that the SMF was removed from the multicast session (e.g., via a N1 container sent to an RAN node and then forwarded to the UE), and then remove information related to the multicast session from the PDU session (e.g., QoS flows to deliver multicast data, via N2 container to be processed by the RAN node). At 611, the SMF may unsubscribe, at the AMF, from notifications about the UE location or the UE moving in or out of a subscribed "area of interest" event using a Namf_EventExposure service.

In certain embodiments, the UE may enter the service area of the multicast session. For example, at 613, the SMF may determine when to apply individual delivery towards the UE (i.e., the SMF may determine to transmit data related to the multicast session via unicast delivery within a PDU session of the UE). At 615, the SMF may configure the UPF to transmit data to the multicast session via unicast delivery within a PDU session of the UE. At 617, if the UPF has not received data related to the multicast session, the SMF may request, from the MB-SMF, that data related to the multicast session be delivered to the UPF.

Figure 7:
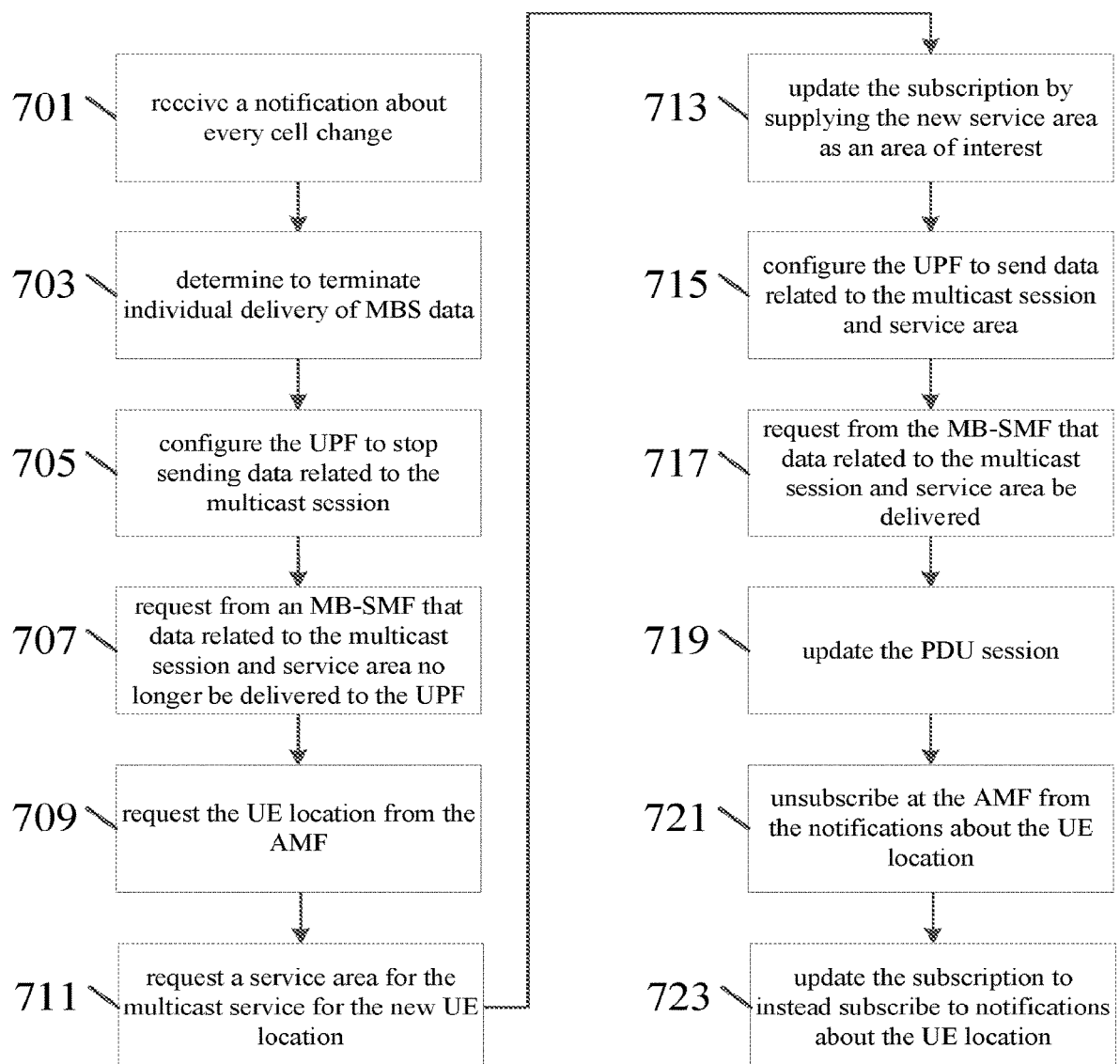
FIG. 7 illustrates a flow diagram of another example of a method according to some embodiments.

FIG. 7 illustrates an example of a flow diagram of a method that may be performed by a SMF, such as NE 910 illustrated in FIG. 9, according to various embodiments.

At 701, if the SMF has subscribed to location changes, the SMF may receive a notification about every cell change. For example, if the notifications relate to the UE moving in or out of a subscribed "area of interest" event, the SMF may receive notifications when the UE enters or leaves the area of interest. If the SMF receives a UE location change notification, the SMF may check whether the new UE location is inside or outside the old service area of the MBS session where the UE was previously located (if any).

At 703, if the UE leaves a service area of the multicast session, SMF 340 may determine to terminate individual delivery of MBS data for that old service area to the UE. As will be discussed in more detail below, the SMF may also check if the UE is in another service area of the multicast session. If so, the SMF may configure individual delivery of MBS data for the new service area to the UE. Otherwise, in some embodiments, the SMF may remove the UE from the MBS session.

In some embodiments, the UE may leave a previous service area of the multicast session. In this situation, at 705, the SMF may configure the UPF to stop sending data related to the multicast session and service area via unicast delivery within a PDU session of the UE. At 707, if the UPF does not require data related to the multicast session and service area for other UEs, the SMF may request from an MB-SMF that data related to the multicast session and service area no longer be delivered to the UPF.

At 709, if the SMF has subscribed to the AMF to notifications related to the area of interest event, and was only informed that the UE left the area of interest at 701, the SMF may request the UE location from the AMF using a Namf_EventExposure service. At 711, if the SMF has no information about a service area for the multicast service for the new UE location, the SMF may request a service area for the multicast service for the new UE location from an NRF.

In certain embodiments, the UE may enter a new service area of the multicast session. In these embodiments, at 713, if the SMF subscribed to the AMF to notifications related to the area of interest event, the SMF may update the subscription by supplying the new service area as an area of interest. At 715, the SMF may configure the UPF to send data related to the multicast session and service area via unicast delivery within a PDU session of the UE. At 717, if the UPF has not received data related to the multicast session and service area, the SMF may request from the MB-SMF that data related to the multicast session and service area be delivered to the UPF.

In some embodiments, if the UE is not in any service area of the multicast session, the SMF may decide to remove the UE from the multicast session. For example, at 719, the SMF may update the PDU session to inform the UE that the SMF was removed from the multicast session (e.g., via a N1 container sent to the RAN node and then forwarded to the UE), and then remove information related to the multicast session from the PDU session (e.g., QoS flows to deliver multicast data, via N2 container to be processed by the RAN node). At 721, the SMF may unsubscribe at the AMF from the notifications about the UE location or the UE moving in or out of a subscribed "area of interest" event using a Namf_EventExposure service.

At 723, if the UE is not in a service area of the multicast session, and the SMF previously subscribed at the AMF to notification related to the area of interest event, the SMF may update the subscription to instead subscribe to notifications about the UE location.

Figure 8:
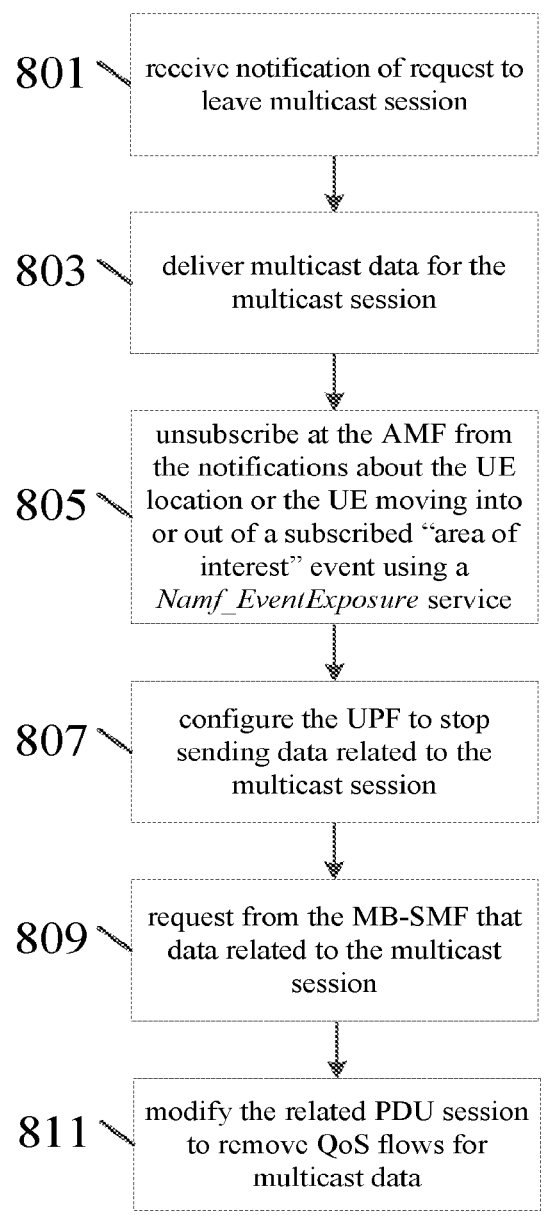
FIG. 8 illustrates a flow diagram of another example of a method according to several embodiments.

FIG. 8 illustrates an example of a flow diagram of a method that may be performed by a SMF, such as NE 910 illustrated in FIG. 9, according to various embodiments.

At 801, when a UE (which may be similar to UE 920 as illustrated in FIG. 9) requests to leave a multicast session, the SMF is informed. During handover of a UE within a multicast session, the SMF serving the UE may discover via signalling from a RAN (via an AMF) whether a RAN node serving the UE supports MBS. If the multicast session is terminated, the SMF is informed by a MB-SMF.

At 803, multicast data for the multicast session may be delivered to the UE via individual delivery. If the UE requests to leave the multicast session, if the target RAN node serving the UE after a handover supports MBS, and/or if the MBS session is terminated, the SMF may terminate individual delivery.

At 805, the SMF may unsubscribe at the AMF from the notifications about the UE location or the UE moving into or out of a subscribed "area of interest" event using a Namf_EventExposure service.

At 807, the SMF may configure the UPF to stop sending data related to the multicast session and possible service area via unicast delivery within a PDU session of the UE.

At 809, if the UPF does not require data related to the multicast session and possible service area for other UEs, the SMF may request from the MB-SMF that data related to the multicast session and possible service area are no longer delivered to the UPF.

At 811, the SMF may modify the related PDU session to remove QoS flows for multicast data (e.g., in an N2 container to be handled by the RAN node). If a UE leave request was received at 801, the SMF may accept the leave request (within a N1 container to be delivered to the UE).

FIG. 9 illustrates an example of a system according to certain example embodiments. In one example embodiment, a system may include multiple devices, such as, for example, NE 910 and/or UE 920.

NE 910 may be one or more of a base station, such as an eNB or gNB, a serving gateway, a server, and/or any other access node or combination thereof. Furthermore, NE 910 and/or UE 920 may be one or more of a citizens broadband radio service device (CBSD).

NE 910 may further comprise at least one gNB-CU, which may be associated with at least one gNB-DU. The at least one gNB-CU and the at least one gNB-DU may be in communication via at least one F1 interface, at least one $X_n$-C interface, and/or at least one NG interface via a SGC.

UE 920 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

NE 910 and/or UE 920 may include at least one processor, respectively indicated as 911 and 921. Processors 911 and 921 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 912 and 922. The memory may be fixed or removable. The memory may include computer program instructions or computer code contained therein. Memories 912 and 922 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 911 and 921, memories 912 and 922, and any subset thereof, may be configured to provide means corresponding to the various blocks of FIGS. 1-8. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 9, transceivers 913 and 923 may be provided, and one or more devices may also include at least one antenna, respectively illustrated as 914 and 924. The device may have many antennas, such as an array of antennas configured for multiple input multiple output (MIMO) communications, or multiple antennas for multiple RATs. Other configurations of these devices, for example, may be provided. Transceivers 913 and 923 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIGS. 1-8). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-8. For example, circuitry may be hardware-only circuit implementations, such as analog and/or digital circuitry. In another example, circuitry may be a combination of hardware circuits and software, such as a combination of analog and/or digital hardware circuitry with software or firmware, and/or any portions of hardware processors with software (including digital signal processors), software, and at least one memory that work together to cause an apparatus to perform various processes or functions. In yet another example, circuitry may be hardware circuitry and or processors, such as a microprocessor or a portion of a microprocessor, that includes software, such as firmware, for operation. Software in circuitry may not be present when it is not needed for the operation of the hardware.

Figure 10:
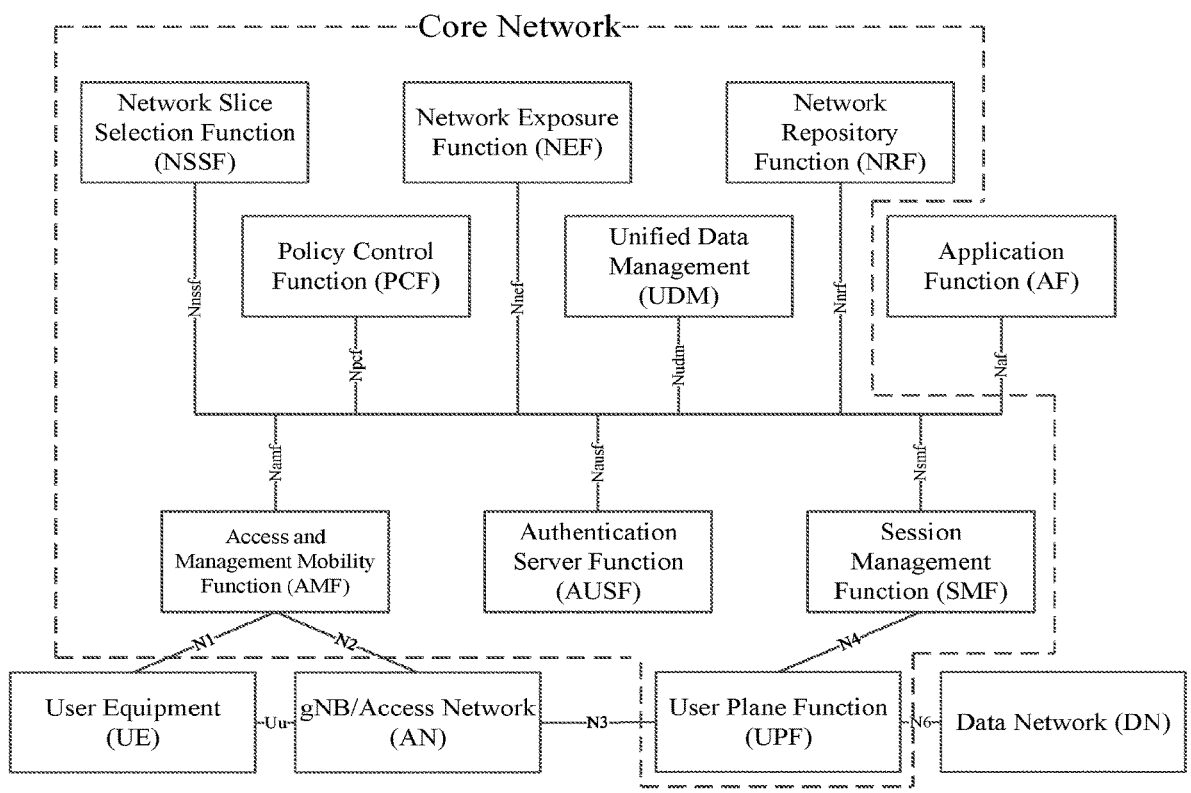
FIG. 10 illustrates an example of a 5G network and system architecture according to certain embodiments.

FIG. 10 illustrates an example of a 5G network and system architecture according to certain embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 10 may be similar to NE 910 and UE 920, respectively. The user plane function (UPF) may provide services such as intra-RAT and inter-RAT mobility, routing and forwarding of data packets, inspection of packets, user plane quality of service (QoS) processing, buffering of downlink packets, and/or triggering of downlink data notifications. The application function (AF) may primarily interface with the core network to facilitate application usage of traffic routing and interact with the policy framework.

Certain embodiments described herein may have various benefits and/or advantages to overcome the disadvantages described above. For example, certain embodiments may enable local and location dependent MBS services to work with RAN nodes not supporting MBS, such as when a 5GC individual MBS traffic delivery method is used. Thus, certain embodiments discussed below are directed to improvements in computer-related technology.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

PARTIAL GLOSSARY

3GPP Third Generation Partnership Project
5G Fifth Generation
5GC Fifth Generation Core
5GS Fifth Generation System
AF Application Function
AMF Access and Mobility Management Function
ASIC Application Specific Integrated Circuit
AS Access Stratum
BS Base Station
CBSD Citizens Broadband Radio Service Device
CN Core Network
CPU Central Processing Unit
eMBB Enhanced Mobile Broadband
eMTC Enhanced Machine Type Communication
eNB Evolved Node B
eOLLA Enhanced Outer Loop Link Adaptation
EPS Evolved Packet System
gNB Next Generation Node B
GPS Global Positioning System
HDD Hard Disk Drive
LTE Long-Term Evolution
LTE-A Long-Term Evolution Advanced
MAC Medium Access Control
MBS Multicast/Broadcast Service
MB-SMF Multicast/Broadcast Session Management Function
MIMO Multiple Input Multiple Output
MME Mobility Management Entity
mMTC Massive Machine Type Communication
MPDCCH Machine Type Communication Physical Downlink Control Channel
MTC Machine Type Communication
NAS Non-Access Stratum
NE Network Entity
NG Next Generation
NG-eNB Next Generation Evolved Node B
NG-RAN Next Generation Radio Access Network
NR New Radio
NR-U New Radio Unlicensed
PDA Personal Digital Assistance
PDU Protocol Data Unit
PRB Physical Resource Block
QoS Quality of Service
RAM Random Access Memory
RAN Radio Access Network
RAT Radio Access Technology
SDU Service Data Unit
SMF Session Management Function
UE User Equipment
UL Uplink
UMTS Universal Mobile Telecommunications System
UPF User Plane Function
URLLC Ultra-Reliable and Low-Latency Communication
UTRAN Universal Mobile Telecommunications System Terrestrial Radio Access Network
WLAN Wireless Local Area Network

We claim:

1. A method, comprising:
   receiving, by a session management node, information that a user equipment is participating in a multicast session;
   determining, by the session management node, that the user equipment is served by a radio access node that does not support multicast sessions;
   determining, by the session management node, that the multicast session is only to be delivered to one or several service areas;
   in response to determining that the user equipment is served by the radio access node not supporting multicast and that the multicast session is only to be delivered to one or several service areas, subscribing, by the session management node, to at least one notification from at least one access and mobility management node;
   receiving, by the session management node, at least one notification from the at least one access and mobility management node associated with at least one location change of the user equipment;
   determining, by the session management node, that the user equipment is located in a service area of the multicast session; and
   in response to the user equipment being served by the radio access node not supporting multicast, the user equipment being located in the service area of the multicast session, and data associated with the multicast session not yet transmitted within a protocol data unit session of the user equipment, configuring, by the session management node, a user plane function to transmit data associated with the multicast session within the protocol data unit session of the user equipment.

2. The method of claim 1, wherein the information that the user equipment is participating in the multicast session is received in a join request of the user equipment for the multicast session.

3. The method of claim 1, wherein the determining that the user equipment is served by a radio access node not supporting multicast sessions further comprises:
   configuring, by the session management node, a protocol data unit session of the user equipment with information about the multicast session; and
   receiving, by the session management node, a message updating session management context of the protocol data unit session without information about the multicast session.

4. The method of claim 1, wherein the determining that the user equipment is served by a radio access node not supporting multicast sessions occurs during a modification or a setup of the protocol data unit session of the user equipment with information about the multicast session after receiving a join request of the user equipment for the multicast session, or when the user equipment is handed over to a radio access node not supporting multicast.

5. The method of claim 1, wherein the determining that the multicast session is only to be delivered to one or several service areas further comprises:
acquiring, by the session management node, from a network repository function or multicast broadcast session management function, information about the multicast session comprising at least one service area associated with the multicast session.

6. The method of claim 1, wherein the at least one notification received from the at least one access and mobility management node associated with at least one location change comprises a notification of the Namf_EventExposure service associated with at least one of "user equipment location" or "user equipment moving out of area of interest" events.

7. The method of claim 1, wherein the subscription to the "user equipment moving out of area of interest" event comprises the service area of the multicast service where the user equipment is located as area of interest.

8. The method of claim 1, wherein the transmitted data associated with the multicast session is associated with the service area of the multicast session where the user equipment is located.

9. The method of claim 1, further comprising:
determining, by the session management node, that the user equipment left a service area of the multicast session; and
upon determining that the user equipment left a service area of the multicast session, and that data associated with the multicast session and service area are transmitted within a protocol data unit session of the user equipment, configuring, by the session management node, the user plane function to terminate transmitting data associated with the multicast session and service area within the protocol data unit session of the user equipment.

10. The method of claim 9, wherein the determining that the user equipment left a service area of the multicast session further comprises at least one of:
obtaining a notification from the at least one access and mobility management node that the user equipment left the area of interest; and
obtaining location information about the user equipment according to at least one of:
within a protocol data unit session management related message for the user equipment;
by inquiring the at least one access and mobility management node for the location of the user equipment; or
within the at least one notification from at least one access and mobility management node associated with at least one location change of the user equipment.

11. An apparatus, comprising:
at least one processor; and
at least one memory including computer program code, the at least one memory and the computer program code configured to, with the at least one processor, cause the apparatus at least to perform:
receiving information that a user equipment is participating in a multicast session;
determining that the user equipment is served by a radio access node that does not support multicast sessions;
determining that the multicast session is only to be delivered to one or several service areas;
in response to determining that the user equipment is served by the radio access node not supporting multicast and that the multicast session is only to be delivered to one or several service areas, subscribing to at least one notification from at least one access and mobility management node;
receiving at least one notification from the at least one access and mobility management node associated with at least one location change of the user equipment;
determining that the user equipment is located in a service area of the multicast session; and
in response to the user equipment being served by the radio access node not supporting multicast, the user equipment being located in the service area of the multicast session, and data associated with the multicast session not yet transmitted within a protocol data unit session of the user equipment, configuring a user plane function to transmit data associated with the multicast session within the protocol data unit session of the user equipment.

12. The apparatus of claim 11, wherein the information that the user equipment is participating in the multicast session is received in a join request of the user equipment for the multicast session.

13. The apparatus of claim 11, wherein the determining that the user equipment is served by a radio access node not supporting multicast sessions further comprises:
configuring a protocol data unit session of the user equipment with information about the multicast session; and
receiving a message updating session management context of the protocol data unit session without information about the multicast session.

14. The apparatus of claim 11, wherein the determining that the user equipment is served by a radio access node not supporting multicast sessions occurs during a modification or a setup of the protocol data unit session of the user equipment with information about the multicast session after receiving a join request of the user equipment for the multicast session, or when the user equipment is handed over to a radio access node not supporting multicast.

15. The apparatus of claim 11, wherein the determining that the multicast session is only to be delivered to one or several service areas further comprises:
acquiring from a network repository function or multicast broadcast session management function, information about the multicast session comprising at least one service area associated with the multicast session.

16. The apparatus of claim 11, wherein the at least one notification received from the at least one access and mobility management node associated with at least one location change comprises a notification of the Namf_EventExposure service associated with at least one of "user equipment location" or "user equipment moving out of area of interest" events.

17. The apparatus of claim 11, wherein the subscription to the "user equipment moving out of area of interest" event comprises the service area of the multicast service where the user equipment is located as area of interest.

18. The apparatus of claim 11, wherein the transmitted data associated with the multicast session is associated with the service area of the multicast session where the user equipment is located.

19. The apparatus of claim 11, wherein the at least one memory and the computer program code are further configured to, with the at least one processor, cause the apparatus at least to perform:
    determining that the user equipment left a service area of the multicast session; and
    upon determining that the user equipment left a service area of the multicast session, and that data associated with the multicast session and service area are transmitted within a protocol data unit session of the user equipment, configuring the user plane function to terminate transmitting data associated with the multicast session and service area within the protocol data unit session of the user equipment.

20. The apparatus of claim 19, wherein the determining that the user equipment left a service area of the multicast session further comprises at least one of:
    obtaining a notification from the at least one access and mobility management node that the user equipment left the area of interest; and
    obtaining location information about the user equipment according to at least one of:
    within a protocol data unit session management related message for the user equipment;
    by inquiring the at least one access and mobility management node for the location of the user equipment; or
    within the at least one notification from at least one access and mobility management node associated with at least one location change of the user equipment.

\* \* \* \* \*